A
United States Patent [19]

Jaffe et al.

[11] 3,784,408

[45] Jan. 8, 1974

[54] PROCESS FOR PRODUCING XYLOSE

[75] Inventors: Gerald Myer Jaffe; William Szkrybalo, both of Verona; Peter Hans Weinert, Wayne, all of N.J.

[73] Assignee: Hoffmann-LaRoche Inc., Nutley, N.J.

[22] Filed: Sept. 16, 1970

[21] Appl. No.: 72,898

Related U.S. Application Data

[63] Continuation-in-part of Ser. No. 863,358, Oct. 29, 1969, abandoned.

[52] U.S. Cl............. 127/37, 260/124 R, 260/635 C
[51] Int. Cl............................................. C13k 9/00
[58] Field of Search.................. 260/602, 635 C; 127/37

[56] References Cited
UNITED STATES PATENTS

| | | | |
|---|---|---|---|
| 3,558,725 | 1/1971 | Kohno et al. | 260/635 C |
| 3,579,380 | 5/1971 | Friese | 260/635 C |
| 2,944,922 | 7/1960 | Boggs | 127/37 |
| 2,959,500 | 11/1960 | Schlapfer | 127/37 |
| 2,974,067 | 3/1961 | Apel | 127/37 |
| 2,989,569 | 6/1961 | Apel | 127/37 X |
| 3,212,932 | 10/1965 | Hess | 127/37 |
| 3,479,248 | 10/1969 | Nobile | 127/37 X |

OTHER PUBLICATIONS

Wolfrom et al., J.A.C.S., Vol. 64, page 1739, 1942.
Hudson et al., JACS, Vol. 40, pages 1601–1602, 1918.

*Primary Examiner*—Morris O. Wolk
*Assistant Examiner*—Sidney Marantz
*Attorney*—Samuel L. Welt, Jon S. Saxe, Bernard S. Leon, William H. Epstein and George M. Gould

[57] ABSTRACT

Material containing cellulose, lignins and xylan is hydrolyzed and the resulting aqueous solution is extracted with methanol to obtain crystalline xylose. The xylose may be hydrogenated to produce xylitol.

5 Claims, No Drawings

PROCESS FOR PRODUCING XYLOSE

CROSS REFERENCE TO RELATED APPLICATIONS

This application is a continuation-in-part of United States Patent Application Ser. No. 863,358 filed Oct. 29, 1969 now abandoned.

BACKGROUND OF THE INVENTION

Xylitol, a sweetening agent, has been prepared via xylose from xylan and cellulose containing materials by hydrolyzing with either concentrated or dilute acids. The xylose obtained by these procedures suffers from the disadvantage that it is produced along with a mixture of pentoses, hexoses and lignins which can only be separated into the individual components with great difficulty and high losses. Furthermore, these separation and purification techniques have proven to be both expensive and time-consuming.

The xylose which is produced by these processes in order to be utilized as an intermediate for xylitol must be subjected to reduction. The reduction of the aldehyde or keto groups of reducing sugars such as xylose to produce xylitol has been carried out by known methods such as in a chemical or catalytic manner. For example, xylose has been reduced to xylitol with the aid of a sodium amalgam or in the presence of a nickel catalyst. However, in order to carry out this reaction, it is necessary to utilize pure xylose since slight impurities, particularly lignins, can poison the catalyst and cause a standstill in this reduction step. This standstill results in not being able to resume the reduction reaction.

In order to overcome these disadvantages, it has been proposed to produce xylose by utilizing as starting materials only those materials which have a high xylose content and a low lignin content. These materials are rather expensive and impurities still have to be removed from the xylose by expensive and time-consuming procedures with high losses. Therefore, it has long been desired to provide a means for producing substantially chemically pure xylose from inexpensive cellulose materials without the necessity for utilizing cumbersome separation procedures.

SUMMARY OF THE INVENTION

In accordance with this invention, substantially chemically pure xylose for direct conversion into xylitol can be produced from cellulose and xylan containing materials by first treating these extracts with an acid hydrolyzing agent in an aqueous medium to precipitate the lignins. The resulting aqueous solution is then passed through an ion exchange resin bed and the effluent from said bed which is dried is dissolved in methanol forming xylose as a crystalline material. The crystalline xylose which is isolated from the methanolic solution can be dissolved in an aqueous medium and hydrogenated in the conventional manner to form xylitol.

In accordance with this process, it has been found that the xylose produced has such a high degree of purity that hydrogenation of the xylose proceeds without the danger of the hydrogenation coming to a standstill. Furthermore, by this process, substantially chemically pure xylose can be obtained from aqueous hemicellulose extracts such as wood extracts which are waste material of the paper and wood industry without the necessity for utilizing expensive and cumbersome separation and purification techniques.

DETAILED DESCRIPTION

In accordance with this invention, xylitol is produced by hydrogenating xylose which has been isolated from aqueous extracts of hemicellulose materials.

In accordance with this invention, xylitol is produced by hydrogenating xylose which has been produced from hemi-cellulosic materials. As the starting material, any cellulosic material containing xylan and cellulose can be utilized. These cellulosic materials generally contain lignins and carbohydrates which are mixtures of monomers and polymers of saccharide materials such as hexoses and pentoses. The cellulosic materials which can be utilized can be in the form of a dried ground material or in the form of an aqueous extract of a hemicellulosic material.

Among the suitable cellulosic materials for carrying out the process in accordance with this invention are included all angiosperms, that is both monocotyledonous plants such as grasses (e.g., oats, bagasse or maize) and dicotyledonous plants such as conifers, decidous trees (e.g., beech, poplar, birch or alder). Of the starting materials quoted by way of example, beechwood, which is available in large quantities and has small economic value, is especially useful. Especially suitable are freshly cut and air-dried beechwood shavings, oat hulls and corn cobs.

If it is desired to utilize extracts in the process of this invention, these extracts can be obtained by treating hemi-cellulose materials with water or steam at temperatures of from 110°C. to 190°C. and at pressures of from about 15 to 20 pounds per square inch gauge. The steam or water extracts the carbohydrates and lignins from the cellulose materials into an aqueous medium. These extracts generally contain lignins, polysaccharides and monosaccharides. The monosaccharides include pentose and hexose sugars such as glucose, mannose, galactose, xylose and arabinose. The polysaccharides include the polymeric forms of these hexose and pentose sugars. Generally, based upon its solids content, aqueous extracts of hemicellulose materials such as aqueous wood extracts contain from an 5 to 30 percent bp weight of lignins and from 70 to 95 percent by weight of carbohydrates which include both polysaccharides and monosaccharides. These aqueous hemicellulose extracts usually contain from 10 to 40 percent by weight of xylose, based upon the solids content of the extract.

These aqueous hemicellulose extracts are generally prepared as an aqueous solution or in the form of a concentrated liquid, i.e., a liquid having a solids content of from 40 to 60 percent and a water content of from 40 to 60 percent by weight. The amount of constituents and components in the solids of the wood extracts vary according to the season of the year, the type of wood, and the wood treating conditions. By way of example, hard wood provides a higher amount of pentose sugars than soft wood and, in this connection, the carbohydrates in the wood hydrolysates are predominantly pentoses. On the other hand, in the case of the treatment of soft wood, carbohydrates in the extracts are mainly hexoses. The use of these extracts is desirable since they are regarded as waste products of the pulp and paper industry.

In the first step of this process, an aqueous solution containing the cellulosic material is hydrolyzed with an acid hydrolyzing agent. Any conventional acid hydrolyzing agent can be utilized such as the inorganic mineral acids, i.e., sulfuric acid, hydrochloric acid, etc. and the organic acids such as halogenated lower alkanoic acids, i.e., trichloroacetic acid, monochloroacetic acid, etc. Generally, inorganic acids such as sulfuric acid are preferred in this process. The inorganic acids can be utilized in either their dilute or concentrated forms. The acid hydrolyzing agent can be present in the aqueous solution in an amount of from about 1 percent by weight to about 20 percent by weight of the cellulosic material to be hydrolyzed. The treatment with the acid hydrolyzes the polysaccharides to the monosaccharides and converts the lignins into insoluble material which can be removed by filtration. These hydrolysis reactions can take place at room temperature, i.e., about 20°C. Generally, it is preferred, in carrying out these hydrolysis reactions to utilize elevated temperatures, i.e., from 55°C. to 150°C. Atmospheric pressure or elevated pressure can be utilized. Generally, it is preferred to carry out this hydrolysis under pressure, i.e., from about 5 to 100 p.s.i.g.

This hydrolysis reaction converts the polysaccharides in the cellulosic materials to monosaccharides and the lignins to insoluble lignins. These insoluble lignins precipitate from the aqueous solution upon hydrolysis. These insoluble lignins can be removed from the aqueous solution containing the mixture of monosaccharides by conventional means such as filtration.

After filtration, the aqueous solution is passed through an ion exchange resin bed. Any conventional cationic or anionic ion exchange resin can be utilized for the purposes of the present invention.

The anionic ion exchange resins employed for the purposes of the present invention include, e.g., cross-linked polystyrene containing quaternary ammonium groups or substituted amines such as $-N(C_3H_8)_2$ groups, polycondensation products of phenol and formaldehyde containing amino groups, polymerization products of aromatic amines and formaldehyde, guanidine-formaldehyde resins, polyamines, phenolformaldehyde resins, etc. These anionic resins are commercially available under such trade names as:

Amberlite (types IR-4B, IR-45, IRA-410, IRA-93, IRA-400) (Rohm & Haas)
Dowex (types 1 and 2) ( Dow Corning)
Wofatite M (I. G. Farben)
Permutit S (Permutit A.G.)
Kastel A-300 etc. (Montecatini)
Permutit D.R. (Permutit A.G.)

Any conventional cationic ion exchange resin can be utilized in this reaction. Among the preferred cationic ion exchange resins are included the nuclear sulfonic acid cationic ion exchange resins such as polystyrene sulfonic acid type resins sold under trade names such as IR-120 and Dowex 50.

In accordance with a preferred embodiment of this invention, the aqueous solution is passed first through a cationic ion exchange resin bed and then through an anionic ion exchange resin bed. However, in accordance with this invention, the aqueous solution can be passed either through a cationic ion exchange resin bed or through an anionic ion exchange resin bed.

In accordance with this invention, it has been found that filtration of the aqueous solution through the ion exchange resin bed decolorizes the aqueous solution and removes any entrained lignin particles. The effluent coming from the column is decolorized and has all of the lignin particles removed therefrom.

In accordance with the process of this invention, the effluent from the ion exchange resin treatment, in the next step, is dried to a water content of from 5 to 15 percent by weight. Any conventional means of drying the effluent can be utilized in accordance with this invention. These methods include evaporation, roll or spray drying. The evaporation can take place by use of high temperature or vacuum conditions. The dried product can be either a powder containing about 5 percent by weight of water or a viscous syrup containing about 15 percent by weight of water.

After the effluent from the ion exchange resin treatment has been dried to a water content of from 5 to 15 percent, the dried effluent is dissolved in methanol. The pH of the effluent which is dissolved in the methanol should be from 4 to 8. If necessary, the pH of the effluent can be adjusted within this range by the addition of a small amount of an alkali or alkaline earth metal hydroxide or an alkali metal or alkaline earth metal salt. Among the additives which can be utilized to adjust the pH of the effluent are included sodium hydroxide, potassium hydroxide, calcium hydroxide, magnesium hydroxide, sodium bicarbonate, sodium phosphate, calcium carbonate, etc. The adjustment of the pH of the effluent to a value of from 4 to 8 can take place prior to drying the effluent. On the other hand, the pH of the effluent can be adjusted after drying has taken place.

The dried effluent is mixed with the methanol so that the effluent dissolves in the methanol. The amount of methanol needed should be sufficient to dissolve the effluent. Generally, it is preferred to utilize at least 0.5 ml. of methanol per gram of the dried effluent. Large excesses of methanol, i.e., 100 ml. of methanol per gram of effluent can be utilized, if desired. However, since no beneficial results are achieved by utilizing such large excesses, i.e., amounts of greater than 100 ml. of methanol per gram of dried effluent, these large amounts are seldom utilized.

The dried effluent can be mixed with the methanol by any conventional procedure. In carrying out this mixing step, temperature and pressure are not critical, and this mixing step can be carried out at room temperature. However, if desired, elevated or reduced temperatures can be utilized. Generally, it is preferred to carry out this mixing step at a temperature of from 10° to 50°C.

In accordance with this invention, it has been found that methanol will dissolve all of the materials in the hydrolyzed cellulosic materials that have been passed through an ionic exchange resin bed except for the xylose contained therein. Hence, by dissolving the hydrolyzed cellulosic materials in methanol, the xylose is crystallized in substantially pure form from the solution. Furthermore, by a means of the process of this invention, the xylose which is obtained as a crystalline precipitate is separated from all of the impurities and other constituents originally present in the cellulosic material. Therefore, the process of this invention produces xylose in substantially chemically pure form.

The xylose can be separated from the methanolic solution by any conventional means such as filtration.

After separation in crystalline form, the xylose can be converted to xylitol.

The xylose which is isolated in crystalline form from the methanolic solution can be converted to xylitol by utilizing any conventional means for converting an aldehyde or keto group to an alcohol. Generally, xylose is converted to the xylitol by hydrogenation in an aqueous medium. This hydrogenation can be carried out in a chemical or catalytic way, for example, with sodium amalgam or a complex metal hydride such as lithium borohydride or sodium borohydride. Preferably a noble-metal catalyst such as platinum or palladium is utilized. Especially preferred are nickel catalysts such as Raney-nickel. However, any conventional means of hydrogenating an aldehyde or ketone can be utilized in accordance with this invention.

The hydrogenation can be carried out under any conventional hydrogenating conditions. Any temperature of from about 70°C. to 120°C. and hydrogen pressures of from about 10 atm. (gauge) to about 50 atm. (gauge) can be utilized. The hydrogenation of xylose to xylitol is preferably carried out in an aqueous medium at a pH of 3 to 10, preferably from 6 to 8 and at a hydrogen atmosphere of about 30 atm. (gauge) and at a temperature of 105° to 110°C. The hydrogenation proceeds quantitatively. The solid catalyst system can be easily removed from the hydrogenated aqueous solution containing the xylitol by conventional processes such as filtration.

In accordance with this invention the hydrogenated reaction solution containing the xylitol can, if desired, be passed through a cationic ion exchange resin bed. Any conventional cationic ion exchange resins such as those mentioned hereinbefore can be utilized. After passing the reaction medium containing the xylitol through the cationic ion exchange resin bed, the reaction medium can be passed, if desired, through an anionic ion exchange resin bed. Any conventional anionic ion exchange resin, such as those mentioned hereinbefore, can be utilized in accordance with this invention. By successively passing the hydrogenated reaction medium through a cationic ion exchange resin bed and then through an anionic ion exchange resin bed, all entrained and residual impurities are removed from the xylitol. The effluent from these beds is colorless liquid. The xylitol can be recovered from the effluent by conventional means such as evaporation.

The invention is further illustrated by the following examples, which are illustrative but not limitative of the claimed invention.

EXAMPLE 1

To 517 ml. water, there was added 100 g. of Masonex syrup, an aqueous wood extract having the following composition:

| Component | Percent by Weight |
| --- | --- |
| 1. Water | 40% |
| 2. Solids | 60% |
| a. Noncarbohydrate | |
| 1) Ash | 4.7% |
| b. Carbohydrates which are present in polysaccharide form | |
| 1) Glucose | 4.4% |
| 2) Mannose | 3.8% |
| 3) Galactose | 1.1% |
| 4) Arabinose | 1.9% |
| 5) Xylose | 16.0% |

After the Masonex was mixed with water, 4.4 ml. of concentrated sulfuric acid was added, giving a total volume of 600 ml. of dark brown solution. 100 ml. of this solution containing 16.7 g. Masonex was heated in a sealed 200 ml. heavy-walled Pyrex pressure flask at 120°C. for 6 hours. The black-brown hydrolyzate was cooled, filtered, and washed with a total of 80 ml. water. It contained 2.63 g. xylose. The filtrate was passed through 120 ml. Amberlite 1R–120 resin ($H^+$ cycle) followed by passage through 120 ml. Amberlite 1RA–93 resin ($OH^-$ cycle). Each resin column was washed with 500 ml. water.

EXAMPLE 2

Isolation of Xylose

The combined eluents and washes prepared in Example 1 were evaporated under vacuum (45°C. bath) and 7.2 g. of a syrup containing 1 g. of water was obtained. This syrup was dissolved in 7.0 ml. of methanol. Xylose was crystallized from this solution by first adding a few seed crystals of D-xylose and stirring the solution in an ice-water bath for five hours and then refrigerating it for five days. After this period, the suspension was filtered. The solids were washed with three portions each 5.0 ml. of methanol (cooled to −10°C.) and then dried to constant weight under vacuum at 35°C. to obtain 0.26 g. xylose of 94.4 percent purity.

EXAMPLE 3

Preparation of Xylitol 10.28 g. of xylose which were prepared in Example 2, were dissolved in 22 ml. of water (deionized). The solution was mixed with 2.0 g. of Raney-nickel (50 percent aqueous suspension) and 0.3 g. of calcium carbonate. The mixture was hydrogenated at 100°C. ± 5° and 450 p.s.i.g. for 4.5 hours. The reaction was cooled to room temperature, filtered and the solids washed with water.

The clear colorless filtrate was deionized by successive passage first through a column of 20 ml. of Amberlite IR 120 [polystyrene divinyl benzene sulfonate cation ion exchange resin in its $H^+$ form] and then through a column of 20 ml. of Amberlite IRA 93 [polystyrene divinyl benzene tertiary amine anion exchange resin in its $OH^-$ form]. The column was washed twice, each time with 50 ml. of water (deionized). The combined eluants were concentrated under vacuum at 40°–45°C. to a syrup (11.2 g.). Then 12.0 ml. of methanol were added and the viscous solution was stirred at 25°C. until crystallization started. The stirring was continued and the suspension was stirred at 0°–3°C. overnight. The mixture was filtered to separate the solids from the mother liquor. The solids obtained by filtration were washed three times with a total of 50 ml. of methanol (cooled to −10°C.). The solids were dried at 35°C. under vacuum. The wash mother liquors were concentrated under vacuum to 1.5 g. of residue which was dissolved in 2.0 ml. of methanol and refrigerated (0°–3°C.) overnight. The second crop was isolated from the filtered mother liquor by crystallization with methanol as described above.

| Xylitol Recovery | | | |
| --- | --- | --- | --- |
| Crop | Weight (grams) | Assay (%) | M.P. °C. (Uncorr.) |
| 1 | 8.50 | 99.8 | 92–94.5 |

| Xylitol Recovery Crop | Weight (grams) | Assay (%) | M.P. °C. (Uncorr.) |
|---|---|---|---|
| II | 0.50 | 98.0 | 91–94.0 |

Yield : 9.0 g. or 92.1% based on Xylose.

EXAMPLE 4

Preparation of Xylose from Oat Hulls

To 480.0 g. water there were added 59 ml. concentrated hydrochloric acid (37 percent by weight HCl) and 120.0 g. of dried, ground oat hulls having the following composition:
1. Water — 7.8 percent
2. Solids — 92.2 percent
   a. Ash — 5.4 percent
   b. Carbohydrates present in their polysaccharide form.
      1. Arabinose — 2.2 percent
      2. Xylose — 21.5 percent
      3. Galactose — 0.7 percent
      4. Glucose — 2.4 percent
      5. Mannose — trace
      6. Other hemicelluloses and proteins — 8-10 percent The suspension was hydrolyzed for three hours at 118°C.–120°C. The hydrolysis mixture was cooled, centrifuged, and the solids were washed with 400 cc. of water. The clear, yellow filtrate containing 25.8 g. xylose was deionized by passing it successively through two ion exchange resin columns, the first one containing 70 ml. Amberlite 1R–120 resin ($H^+$ form) and the second one containing 170 ml. Amberlite 1RA–93 resin ($OH^-$), at 7 ml./minute. Each resin column was washed with two column volumes of water. The eluent and washes were combined and concentrated at 40°–44°C. under vacuum to a syrup weighing 42.8 g. and containing about 4.1 g. of water. To the syrup was added 43.9 ml. methanol. The yellow solution was cooled to −10°C. and agitated at that temperature for 48 hours. Crystallization of xylose took place during that time. The crystalline suspension was filtered, washed with 4 × 10 ml. methanol at −10°C., and dried to a constant weight of 18.0 g. xylose with a purity of 94.0 percent. The chemical yield of xylose based on oat hulls is therefore 14 percent.

EXAMPLE 5

Hydrogenation of Xylose to Xylitol 15.0 g. of xylose prepared in Example 4 were dissolved in 22.5 ml. of water and filtered. The clear, light yellow filtrate was deionized by passing it through a 10 liter Amberlite 1R–120 resin column ($H^+$) followed by passage through a 10 ml. Amberlite 1RA–93 resin column at 2 ml./minute. Each resin column was washed with 20 ml. water.

The combined eluent and washes were mixed with 3.0 g. Raney Nickel catalyst (50 percent by weight aqueous suspension) and 0.015 g. calcium carbonate. The mixture was hydrogenated at 100°C. at 450 p.s.i.g. $H_2$ for 1.5 hours. The mixture was cooled to 25°C. and filtered. The clear, colorless filtrate was passed through a 4 ml. Amberlite 1R–120 resin column ($H^+$) and concentrated at 45°C. under vacuum to a thick syrup containing 91.2 percent solids. 15 ml. of a mixture containing 80 percent by volume of ethanol and 70 percent by volume of methanol were added and the total mixture was cooled to 0°C. Crystallization of xylitol took place during this period. The crystalline suspension was agitated at 0°C. for 48 hours, filtered, washed with 8 ml. of 95 percent by volume ethanol and 5 percent by volume water followed by 2 × 5 ml. of ethanol, and dried to constant weight of 12.2 g. The purity of the isolated xylitol is 99+ percent by glpc. It melts at 93°–95°C. The yield of xylitol from oat hulls thus is 12.1 percent.

We claim:
1. A process for producing xylose from a cellulosic material containing cellulose, lignins, xylan and other carbohydrates, which comprises the steps of
   a. hydrolyzing said cellulosic material with an acid in an aqueous medium to produce an insoluble lignin residue;
   b. separating said insoluble lignin residue from the hydrolyzed aqueous medium;
   c. passing the hydrolyzed aqueous medium through an ion exchange resin bed;
   d. drying the effluent from said bed to a water content of from about 5 to 15 percent by weight, the pH of said effluent being adjusted to about 4 to 8; and
   e. mixing said dried effluent in methanol to form a methanolic solution, and crystallizing xylose as a crystalline precipitate from said methanolic solution.

2. The process of claim 1 wherein said material is aqueous cellulosic extracts.

3. The process of claim 1 wherein said material is dried ground oat hulls.

4. The process of claim 1 wherein the methanol in step (e) is added in an amount of at least 0.5 ml. per gram of the dried effluent.

5. The process of claim 1 wherein said extracts are aqueous extraction products of hard wood.

* * * * *